United States Patent [19]
Forsse

[11] Patent Number: 5,138,783
[45] Date of Patent: Aug. 18, 1992

[54] ARTWORK SYSTEM UTILIZING LIQUID CRYSTAL GATE SHUTTERS FOR CONTROLLING THE ILLUMINATION AND TRANSMISSION OF LIGHT THROUGH TRANSPARENT PANELS

[76] Inventor: Ken Forsse, 210 Cliff Dr., Laguna Beach, Calif. 92651

[21] Appl. No.: 631,467

[22] Filed: Dec. 21, 1990

[51] Int. Cl.$^5$ ............................................. G09F 13/18
[52] U.S. Cl. ...................................................... 40/546
[58] Field of Search ............... 40/546, 581; 362/31, 362/293; 359/53, 83, 39

[56] References Cited

U.S. PATENT DOCUMENTS

| | | | |
|---|---|---|---|
| 2,347,665 | 5/1944 | Christensen et al. | 40/546 X |
| 2,722,762 | 11/1955 | Krajian | 40/546 |
| 3,762,082 | 10/1973 | Mincy | 40/546 X |
| 3,967,881 | 7/1976 | Moriyama | 359/53 |
| 4,491,390 | 1/1985 | Tong-Shen | 359/39 |
| 4,578,672 | 3/1986 | Oota et al. | 359/83 X |
| 4,810,058 | 3/1989 | Sangyoji et al. | 359/83 X |
| 4,974,354 | 12/1990 | Hembrook Jr. | 40/546 |

Primary Examiner—James R. Brittain
Assistant Examiner—J. Bonifanti
Attorney, Agent, or Firm—Kelly, Bauersfeld & Lowry

[57] ABSTRACT

A laminate artwork system includes a plurality of stacked, uniformly spaced light transmitting artwork panels, each having a portion of an overall artwork image etched thereon. The artwork panels are generally rectangular and have aligned edges positioned within a frame. The frame houses fluorescent lamps generally adjacent to and extending the length of the panel edges, and includes an inner reflective surface which directs substantially all of the emitted light towards the panel edges. Disposed between the lamp and the panel edges are a plurality of color filters and shutters which control the transmission and intensity of light permitted to pass therethrough to the edges. The shutters comprise liquid crystal gates responsive to an input signal, which are modulated to allow a varied amount of light to pass through so that different levels of brightness and/or color of the artwork image may be obtained. A unique visual appearance is attained by illuminating the edge of the artwork panels such that the panels themselves act as conduits for the light to the artwork images. Depending on modulation of the liquid crystal gates, various colors and moving images may be obtained in the stacked panels.

20 Claims, 3 Drawing Sheets

ARTWORK SYSTEM UTILIZING LIQUID CRYSTAL GATE SHUTTERS FOR CONTROLLING THE ILLUMINATION AND TRANSMISSION OF LIGHT THROUGH TRANSPARENT PANELS

BACKGROUND OF THE INVENTION

This invention relates generally to illuminated artwork systems. More particularly, the present invention relates to an artwork system including a plurality of stacked, substantially transparent panels having artwork images etched thereon, and means for selectively controlling illumination of the artwork images.

Artists often endeavor to keep abreast of changes in the world and reflect those changes in the art created and the modes of expression. In an environment of ever accelerating technological improvements and breakthroughs, artists have striven to adapt traditional forms of expression to available new technology.

Leadership in the application of modern technology to artistic creation and development has been found in the motion picture and television industries. Many of the spectacular special effects now routinely included in modern motion pictures were not possible only a few years ago. Further, adaptation of modern technological developments by artists can be found in virtually every modern theme park, in products available to the consumer, and in modern advertising methods.

Some artists have thought it to be desirable to provide a mechanism for creating a wall display having multi-dimensional characteristics. Such a display would preferably be capable of having its external appearance modified or varied, on command, to provide a novel mechanism through which the artist could express a particular thought or idea. Such a multi-dimensional display should be capable of presenting a striking visual image which would attract the attention of a viewer, and have meaningful application in the advertisement industry.

There exists, therefore, a need for a multi-dimensional display capable of being illuminated without the need of an exterior light source, which has great application to artists and the advertising industry. Such a display would preferably provide a means whereby an image or images could be etched into the display, and selective portions illuminated on command. Further, such a display is needed wherein the internal illumination of the image can be controlled in response to an input electrical signal, and the intensity of light illuminating any portion of the image closely controlled. Preferably the system would permit the color of the image to be varied to suit virtually any particular application, even if the internal light source is a white-light emitting lamp. Moreover, the artwork system must be of relatively simple construction, and economical to produce and operate. The present invention fulfills these needs and provides other related advantages.

SUMMARY OF THE INVENTION

The present invention resides in an improved artwork system capable of creating a unique visual image sculpted onto a plurality of substantially transparent panels, in response to an input signal. The artwork system comprises, generally, at least one light transmitting artwork panel having at least one edge and a viewing face generally perpendicular to the edge. An artwork image is provided on the panel, and is visible on the viewing face when the edge is illuminated. Means are provided for illuminating the panel edge, and means are disposed between the panel edge and the illuminating means, for controlling transmission of light through the artwork panel. Light illuminating the panel edge is transmitted through the artwork panel to the artwork image, which is selectively illuminated and visible from the face of the panel.

In a preferred form of the invention, the artwork system comprises a plurality of stacked, generally parallel light transmitting artwork panels. Each of the panels includes a viewing face and an edge extending about the periphery of the panel generally perpendicular to the viewing face. The light transmitting artwork panels are substantially transparent.

An artwork image is provided on the stacked panels. Specifically, respective portions of the artwork image are etched into respective panels to capture light transmitted therethrough. Illuminated portions of the sculpted artwork image are visible on the viewing face of each panel by an observer facing the artwork system.

The means for illuminating the edges of the stacked artwork panels include a lamp positioned generally adjacent to and extending the length of the edges. The lamp and the aligned edges of the panels are positioned within the frame, which is provided with an inner reflective surface to direct substantially all of the emitted light towards the panel edges.

The controlling means includes means for intercepting light emitted from the illuminating means. The light intercepting means includes a plurality of shutters which overlie the panel edges in a manner controlling the transmission and intensity of light permitted to pass therethrough to the edges. The controlling means further includes means for modulating the shutters of the intercepting means in response to an input signal.

The shutters comprise liquid crystal gates, and the means for modulating the shutters comprises a control circuit including a bank of liquid crystal drivers. Each driver is electrically connected to a respective single liquid crystal gate to impress upon the gate an electrical signal by which the transparency, translucency or opacity of the liquid crystal gate is controlled in accordance with the input signal. Means are provided for blocking light permitted to pass through one shutter to illuminate a selected portion of the edge of a first panel, from illuminating any portion of the edge of an adjacent second panel.

Means are also provided for color-filtering light emitted from the illuminating means. The light color-filtering means includes sequential red, green/yellow and blue color filters disposed immediately adjacent to the shutters. Modulation of the shutters permits the artwork image, or parts thereof, to be selectably illuminated with a desirable color of light.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
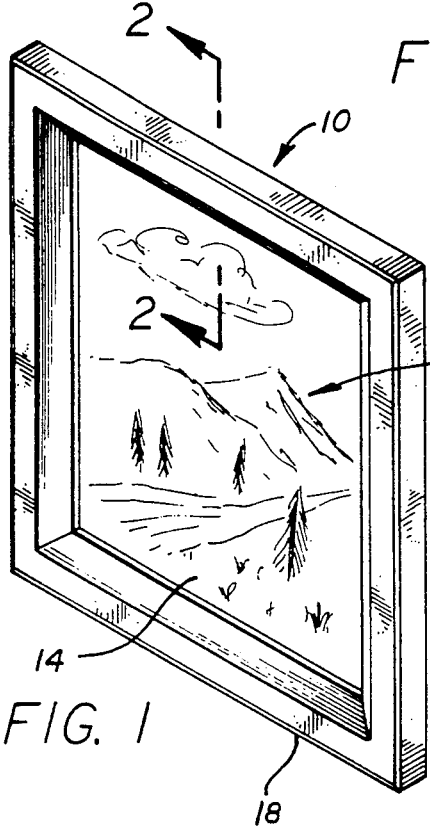
FIG. 1 is a front perspective view of an illuminated artwork system embodying the present invention.
Figure 2:
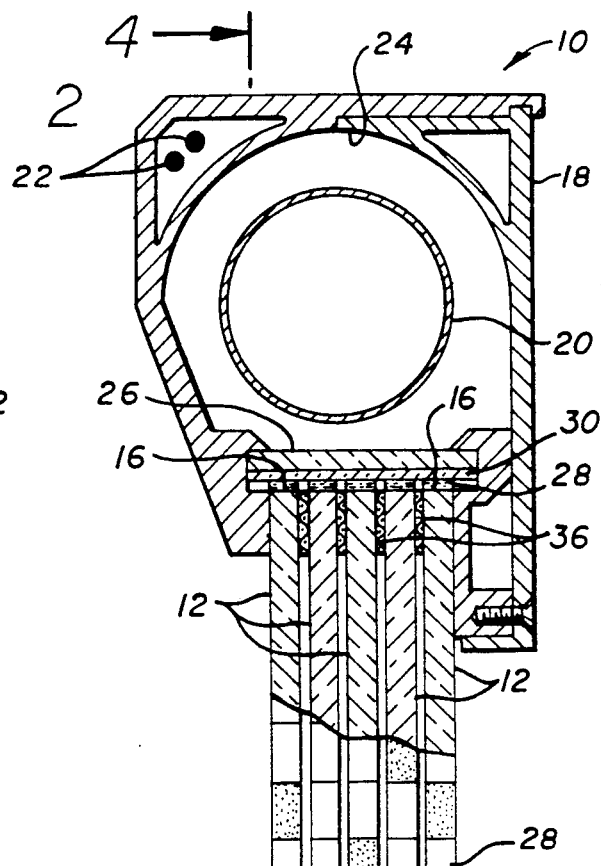
FIG. 2 is an enlarged, fragmented sectional view taken generally along the line 2—2 of FIG. 1, illustrating the relationship of a plurality of light-transmitting panels to one another and with respect to a fluorescent lamp, and having interposed over the sectional figure, for purposes of clarity, the relative position of liquid crystal gate shutters and color filters.

As shown in the drawings for purposes of illustration, the present invention resides in an improved illuminated artwork system, generally designated in the accompanying drawings by the reference number 10. The artwork system 10 permits the combination of modern technology with the best examples of contemporary fine art. The system utilizes Lucite (acrylic resin) panels 12 placed together in a stacked, generally parallel relationship to one another. This laminate arrangement of the panels 12 forms a deep viewing area. The panels 12 are etched to create an artwork image 14, which can be illuminated by light passing through an edge 16 of each Lucite panel 12. The total artwork image 14 is a composite of images etched into each separate panel, and the composite artwork image may have a depth of one inch or more. The panels 12 and a light source are held in place by a frame 18.

Light entering each panel 12 can be controlled to change in color, direction and intensity. Accordingly, within each separate Lucite panel 12 the artwork image 14 can become darker or lighter, change from one color to another, and appear from any direction. All of these changes can occur instantly or over an extended period of time. The color range can be varied from white light through the entire spectrum of color into darkness. Light entering each panel 12 is controlled independently, and the colors in one panel can be the same as that in another panel or they can be strikingly different, thus allowing full flexibility in the appearance of the image. The image, therefore, can be given the illusion of animated motion.

Light changes within the panels 12 can be controlled in a variety of ways. Such light changes can be synchronized to music or sound effects so that a cassette tape can provide the audio source and the programmed control signals. The light changes can also be randomly controlled by a cassette tape, or the viewer can manually control the light, thus being able to manipulate and experiment with the appearance of the image.

In accordance with the present invention and as illustrated with respect to a preferred embodiment in FIGS. 1—5, the light source comprises four fluorescent lamps 20 arranged about the periphery of the stacked Lucite panels 12 and housed within the frame 18. Power is supplied to the lamps 20 utilizing power cords 22 placed within the frame 18 in a standard fashion.

The frame 18 includes an interior reflective surface 24 which directs substantially all emitted light towards the edges 16 of the stack of panels 12 secured within the frame. The panels 12 are separated from the fluorescent lamps 20 by a transparent barrier panel 26.

Figure 3:
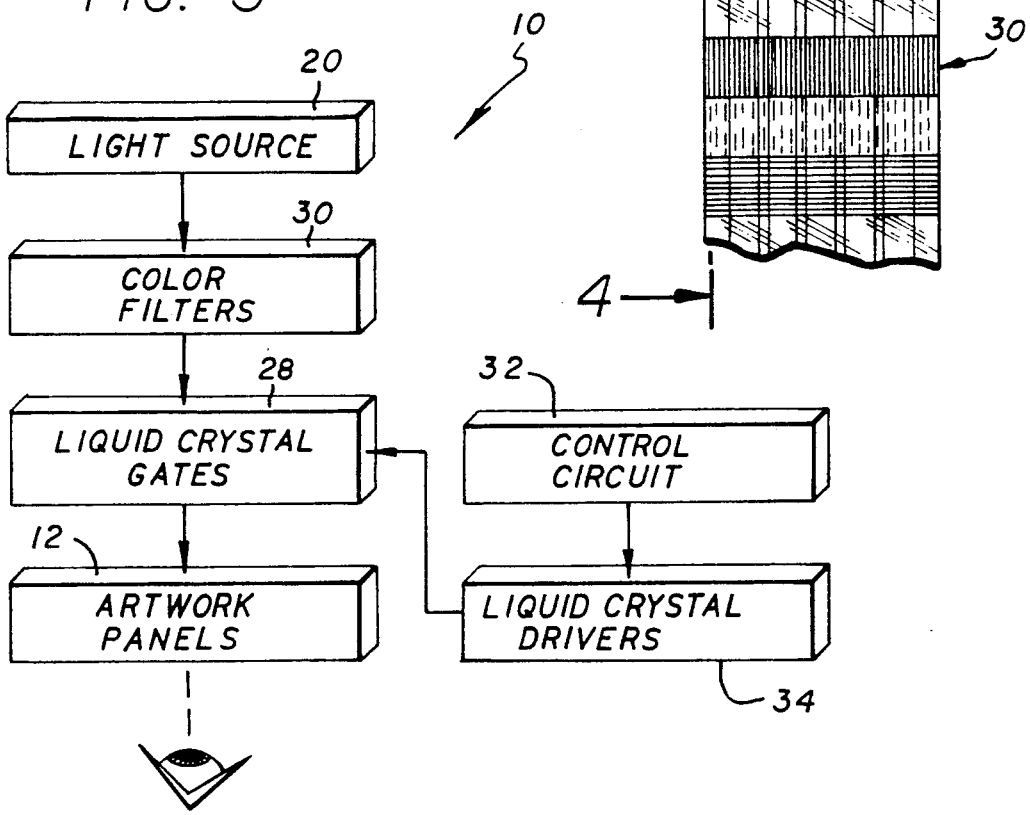
FIG. 3 is a block diagram illustrating the manner in which an artwork image is produced for viewing on the panels in accordance with the present invention.
Figure 4:
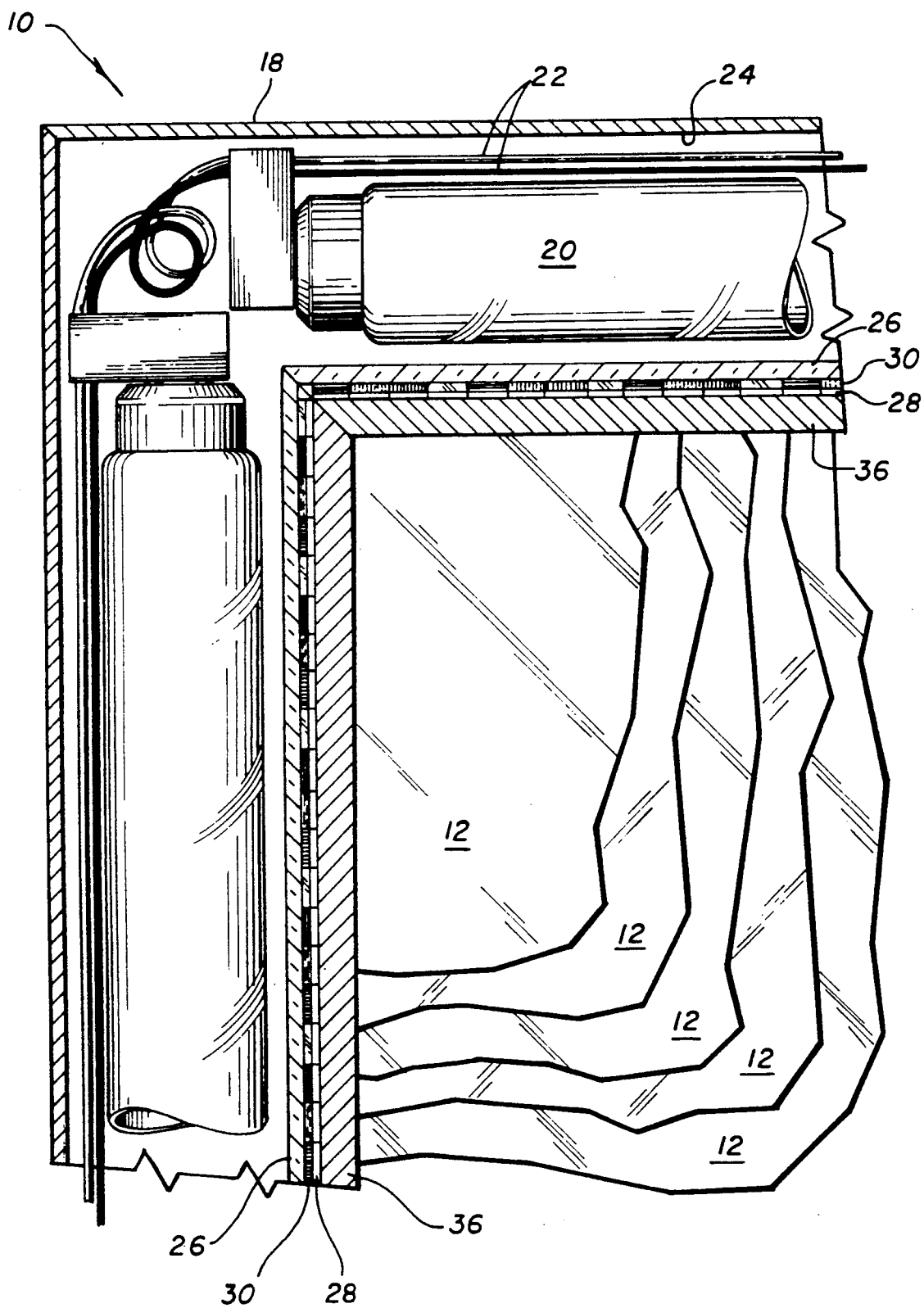
FIG. 4 is a fragmented, partially sectional view taken generally along the line 4—4 of FIG. 2.
Figure 5:
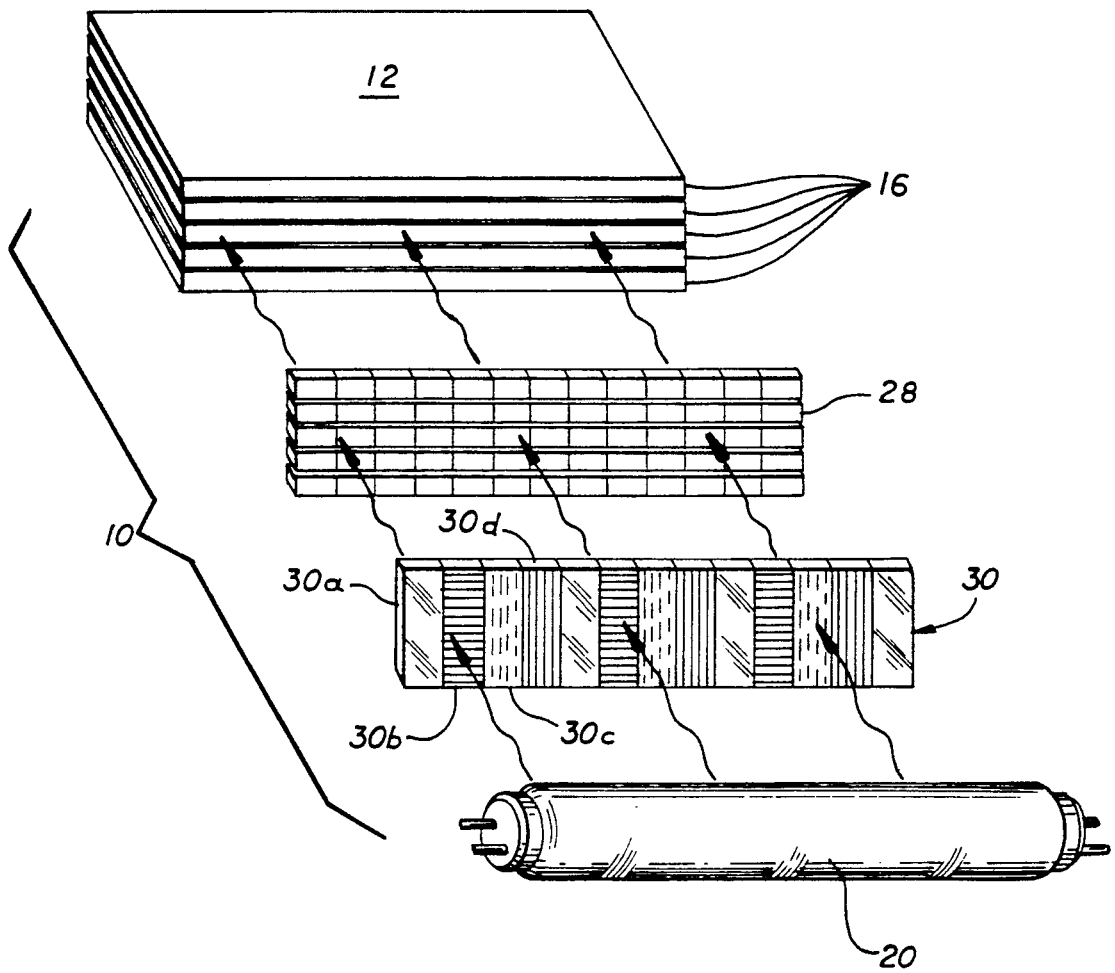
FIG. 5 is an exploded perspective schematic view illustrating the processing of light emitted by the fluorescent lamp through color filters, the liquid crystal gate shutters, and through the edges of the aligned panels to illuminate an artwork image.

As illustrated schematically in FIGS. 3 and 5, means are disposed between the edges 16 of the panels 12 and the fluorescent lamps 20, for controlling illumination of the edges and the transmission of light through the panels. The controlling means includes a plurality of liquid crystal gate shutters 28 which overlie the panel edges 12 in a manner controlling the transmission and intensity of light permitted to pass therethrough to the panel edges. Disposed adjacent to the shutters 28 are sequential color filters 30. In the illustrated embodiment, the color filters include sequential clear panels 30a, red panels 30b, yellow panels 30c and blue panels 30d. The width of the color filter panels 30 correspond to the width of the liquid crystal gate shutters 28. The height of each liquid crystal gate shutter 28 corresponds generally to the depth of a single Lucite panel 12, and spacing is provided between the shutters 28 corresponding to the spacing between separate panels 12.

Means are provided for modulating the shutters 28 in response to an input signal. Such modulating means includes a control circuit 32 including a bank of liquid crystal drivers 34, wherein each driver is electrically connected to a respective single liquid crystal gate shutter 28. Each liquid crystal gate shutter 28 is of the same construction and can be selectively modulated, in accordance with the input signal, to be opaque to incident light for allowing as little light as possible to pass therethrough, translucent to incident light for allowing only some of the light to pass therethrough, or transparent to incident light and allow as much light as possible to pass therethrough. The state of the shutters 28 is determined primarily by the control circuit 32 which provides a signal to the bank of liquid crystal drivers 34, which simultaneously modulate each of the shutters to illuminate the artwork image 14 provided in the panels 12, in accordance with the input signal.

In order to block light permitted to pass through one selected shutter 28 to illuminate a selected portion of the edge 16 of a first panel 12, from illuminating any portion of the edge of an adjacent second panel, opaque spacers 36 are placed adjacent to and between the edges 16 of adjacent panels 12 and extend the length thereof.

To utilize the artwork system 10 of the present invention, portions of the artwork image 14 are sculpted into the Lucite panels 12, which panels are then placed in a stacked arrangement and separated by the opaque spacers 36 extending about the periphery of the panels. The aligned edges 16 of the panels 12 are held in place within a frame 18, which also houses a plurality of fluorescent lamps 20 generally surrounding the periphery of the stacked panels 12. Liquid crystal gate shutters 28 and color filters 30 are disposed immediately adjacent to the aligned edges 16 of the panels such that all light from the fluorescent lamps 20 permitted to illuminate the edges 16 must pass through the filters 30 and the shutters 28.

With the fluorescent lamps 20 emitting white light, the liquid crystal gate shutters 28 can be modulated by the control circuit 32 and the liquid crystal drivers 34, to impress upon each individual shutter an electrical signal by which the transparency, translucency or opacity of the liquid crystal gate shutter is controlled in accordance with an input signal. As mentioned above, the input signal can be manually created or provided by a recorded medium. Light permitted to pass through the shutters 28 and the color filters 30 to the edge 16 of a panel 12 is transmitted through the panel 12 and is visible only when intercepted by an etched portion of the panel. Thus, a viewer facing a top one of the panels 12 would be able to view the artwork image 14, or any portion thereof illuminated by the light. Since there is some dispersion of the light as it passes through the panel 12, several adjacent shutters 28 can be opened simultaneously, in varying degrees, to obtain a desired color through the entire spectrum of visible light.

From the foregoing it is to be appreciated that the artwork system 10 of the present invention permits combination of modern technology with the best examples of contemporary fine art. Light changes can be synchronized to music or sound effects so that a cassette tape can provide an audio source and the programmed control signals. Alternatively, light changes for illuminating the artwork image 14 can be randomly controlled or manually manipulated to control the appearance of the image.

Although a particular embodiment of the invention has been described in detail for purposes of illustration, various modifications may be made without departing from the spirit and scope of the invention. Accordingly, the invention is not to be limited, except as by the appended claims.

I claim:

1. An artwork system, comprising:
   a light transmitting artwork panel having at least one edge and a viewing face generally perpendicular to the at least one edge;
   an artwork image provided on the panel, the image being visible on the viewing face when the at least one edge is illuminated;
   means for illuminating the at least one edge of the artwork panel;
   means disposed between the at least one edge and the illuminating means, for controlling illumination of the at least one edge and transmission of light through the artwork panel, the controlling means including means for intercepting light emitted from the illuminating means, the light intercepting means including a plurality of liquid crystal gate shutters which overlie the at least one edge in a manner controlling the transmission and intensity of light permitted to pass therethrough to the at least one edge; and
   means for modulating the shutters of the intercepting means in response to an input signal, comprising a control circuit including a bank of liquid crystal drivers, wherein each driver is electrically connected to a respective single liquid crystal gate to impress upon the gate an electrical signal by which the transparency, translucency or opacity of the liquid crystal gate is controlled in accordance with the input signal.

2. An artwork system as set forth in claim 1, wherein the artwork image is etched into the panel to capture light transmitted therethrough.

3. An artwork system as set forth in claim 1, wherein the artwork panel includes a plurality of stacked, generally parallel panels having aligned edges which provide the at least one edge.

4. An artwork system as set forth in claim 3, wherein the plurality of panels are generally transparent such that artwork images provided on underlying panels may be viewed through a top panel.

5. An artwork system as set forth in claim 4, wherein the illuminating means includes a fluorescent lamp positioned generally adjacent to and extending the length of the aligned edges.

6. An artwork system as set forth in claim 1, including means disposed between the at least one edge and the illuminating means, for color-filtering light emitted from the illuminating means.

7. An artwork system, comprising:
   a plurality of stacked, generally parallel light transmitting artwork panels, each panel having a viewing face and an edge generally perpendicular to the viewing face;
   an artwork image provided on each of the panels, the artwork image being visible on the viewing face by an observer facing a top one of the panels, when the respective edge is illuminated;
   means for illuminating the edges of the stacked artwork panels;
   means for color-filtering light emitted from the illuminating means;
   a plurality of liquid crystal gate shutters disposed between the edge of each panel and the illuminating means, the shutters overlying the edges in a manner controlling the transmission and intensity of light permitted to pass therethrough to the edges; and
   means for modulating the shutters in response to an input signal, including control circuit including a bank of liquid crystal drivers, wherein each driver is electrically connected to a respective single liquid crystal gate to impress upon the gate an electrical signal by which the transparency, translucency or opacity of the liquid crystal gate is controlled in accordance with the input signal.

8. An artwork systems as set forth in claim 7, including means for blocking light permitted to pass through one shutter to illuminate a selected portion of the edge of the first panel, form illuminating any portion of the edge of a second panel.

9. An artwork system as set forth in claim 7, wherein the light color-filtering means includes sequential red, green/yellow and blue color filters disposed adjacent to the shutters.

10. An artwork system as set forth in claim 7, wherein the artwork image is sculpted into each panel to capture light transmitted through the artwork panel.

11. An artwork system as set forth in claim 7, wherein the illuminating means includes a lamp lying generally adjacent to and extending the length of the edges.

12. An artwork system as set forth in claim 11, wherein the edge extends about the periphery of each panel, and the edges of the panels and the lamp are housed within a frame having an inner reflective surface which directs substantially all emitted light towards the shutters.

13. A laminate artwork system, comprising:
   a plurality of stacked, generally parallel light transmitting artwork panels, each panel having a viewing face and an edge extending about the periphery of the panel generally perpendicular to the viewing face;
   an artwork image provided on the panels, respective portions of the artwork image being sculpted into respective panels to capture light transmitted through the artwork panel such that the artwork image is visible on the viewing face of each panel by an observer facing the artwork system when the panel edges are illuminated;

means for illuminating the edges of the stacked artwork panels, including a lamp positioned generally adjacent to and extending the length of the edges;

a frame for housing the lamp and the edges of the panels, the frame having an inner reflective surface which directs substantially all emitted light towards the panel edges;

means disposed between the panel edges and the illuminating means, for controlling illumination of the edges and transmission of light through the artwork panels, the controlling means including means for intercepting light emitted from the illuminating means, the light intercepting means including a plurality of shutters which overly the panel edges in a manner controlling the transmission and intensity of light permitted to pass therethrough to the edges, and means for modulating the shutters of the intercepting means in response to an input signal, the plurality of shutters comprising liquid crystal gates, and the means for modulating the shutters comprising a control circuit including a bank of liquid crystal drivers, wherein each driver is electrically connected to a respective single liquid crystal gate to impress upon the gate an electrical signal by which the transparency, translucency or opacity of the liquid crystal gate is controlled in accordance with the input signal; and means for color-filtering light emitted from the illuminating means, the light color-filtering means including sequential red, green/yellow and blue color filters disposed adjacent to the shutters.

14. An artwork system as set forth in claim 13, including means for blocking light permitted to pass through one shutter to illuminate a selected portion of the edge of a first panel, from illuminating any portion of the edge of an adjacent second panel.

15. An artwork system, comprising:

a light transmitting artwork panel having at least one edge and a viewing face generally perpendicular to the at least one edge;

an artwork image provided on the panel, the image being visible on the viewing face when the at least one edge is illuminated;

means for illuminating the at least one edge of the artwork panel; and liquid crystal gate shutters disposed between the at least one edge and the illuminating means, for controlling illumination of the at least one edge and transmission of light through the artwork panel.

16. An artwork system as set forth in claim 15, including means for modulating the shutters in response to an input signal.

17. An artwork system as set forth in claim 16, wherein the means for modulating the shutters comprises a control circuit including a bank of liquid crystal drivers, wherein each driver is electrically connected to a respective single liquid crystal gate shutter to impress upon the gate an electrical signal by which the transparency, translucency or opacity of the liquid crystal gate shutter is controlled in accordance with the input signal.

18. An artwork system as set forth in claim 15, including means disposed between the at least one edge and the illuminating means, for color-filtering light emitted from the illuminating means.

19. An artwork system as set forth in claim 15, wherein the artwork panel includes a plurality of stacked, generally parallel panels having aligned edges which provide the at least one edge, wherein the plurality of panels are generally transparent such that artwork images provided on underlying panels may be viewed through a top panel.

20. An artwork system as set forth in claim 19, wherein the illuminating means includes a fluorescent lamp positioned generally adjacent to and extending the length of the aligned edges.

* * * * *

UNITED STATES PATENT AND TRADEMARK OFFICE
CERTIFICATE OF CORRECTION

PATENT NO. : 5,138,783

DATED : August 18, 1992

INVENTOR(S) : Ken Forsse

It is certified that error appears in the above-identified patent and that said Letters Patent is hereby corrected as shown below:

In the Abstract, line 11, delete the word "plurailty" and insert therefor --plurality--.

In the Abstract, line 18, delete the word "edge" and insert therefor --edges--.

In column 6, line 38, delete the word "form" and insert therefor --from--.

Signed and Sealed this

Fourteenth Day of September, 1993

Attest:

BRUCE LEHMAN

*Attesting Officer*    *Commissioner of Patents and Trademarks*